United States Patent Office 2,863,913
Patented Dec. 9, 1958

2,863,913

PROCESS FOR PRODUCING TEREPHTHALIC ACID

Bernhard Raecke, Bruno Blaser, Werner Stein, and Hubert Schirp, Dusseldorf, Germany, assignors to Henkel & Cie. G. m. b. H., Dusseldorf-Holthausen, Germany, a corporation of Germany No Drawing. Application January 7, 1955
Serial No. 480,620

Claims priority, application Germany January 13, 1954

22 Claims. (Cl. 260—515)

This invention relates to a process for the production of terephthalic acid, and more particularly to a process for the production of terephthalic acid from alkali metal salts of phthalic acid and isophthalic acid in the presence of catalysts.

In co-pending applications Ser. No. 392,512, filed November 16, 1953, now abandoned; Ser. No. 449,266, filed August 11, 1954, now abandoned; and Ser. No. 472,245, filed November 30, 1954, now abandoned, it is disclosed that terephthalic acid can be produced by subjecting alkali metal salts of benzene dicarboxylic acids, in which the carboxyl groups stand in ortho- or meta-position relative to each other, to a heat treatment at temperatures between about 340 and 550° C., whereby the alkali metal salts are transformed to a large extent into the corresponding alkali metal salts of terephthalic acid. The heat treatment also results in the formation of alkali metal salts of other valuable benzene carboxylic acids, such as benzoic acid and trimesitinic acid. The mixture of benzene carboxylic acid salts thus obtained is then precipitated by suitable means in the form of the corresponding free benzene carboxylic acids, which are subsequently separated by extraction with hot water or by sublimation. The above co-pending applications further disclose that the transformation of the ortho- or meta-dicarboxylic acid salts into terephthalic acid salts can be favorably influenced by the presence of certain catalysts, for example by the presence of iron, tin, mercury, lead, zirconium, or compounds of these elements, particularly their oxides.

We have found that by heating alkali metal salts of ortho- or meta-benzene dicarboxylic acids to temperatures between 340 and 550° C. in the presence of cadmium-containing or zinc-containing compounds as catalysts, the transformation of said alkali metal salts into the alkali metal salt of terephthalic acid can be very favorably affected and that therefore the subsequent yield of terephthalic acid can be improved.

Suitable starting materials for the transformation reaction in accordance with the present invention are phthalic acid as such or in the form of its anhydride, and isophthalic acid, as well as mixtures of these compounds and their substitution products.

In preparation for the transformation into the alkali metal terephthalate, the starting material is preferably changed into its alkali metal salt, which is then dissolved in water. The aqueous solution is subsequently evaporated by spray-drying or drum-drying, thereby yielding the alkali metal salt in the form of a uniform, homogeneous, dry powder. However, the production of the dry alkali metal salts of the ortho- and meta-benzene dicarboxylic acids in preparation for their transformation into their corresponding terephthalates in accordance with the present invention may also be carried out in the reaction vessel wherein the transformation into the terephthalate is to take place, and the preparatory treatment of the starting materials may also be carried out while they are admixed with the cadmium- or zinc-containing catalyst used in the subsequent transformation reaction.

While it is possible to subject any of the monovalent alkali metal salts of ortho- or meta-benzene dicarboxylic acids to the transformation reaction in accordance with our invention, it is preferred to employ the potassium or sodium salts. The potassium salts of phthalic acid and isophthalic acid have been found to yield particularly large amounts of terephthalate and, hence, of terephthalic acid.

Examples of cadmium compounds and zinc compounds which can advantageously be used as catalysts for the transformation reaction in accordance with our invention are the following: metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, cadmium terephthalate, metallic zinc, zinc oxide, zinc iodide, zinc chloride, zinc sulfate, zinc phosphate, zinc carbonate, zinc acetate, zinc soaps, zinc benzoate, zinc phthalate, zinc isophthalate and zinc terephthalate.

The cadmium-containing compounds may be added to the starting material in amounts ranging up to 5% by weight, or more, based upon the weight of the starting material, and the zinc-containing compounds may be added in amounts ranging up to 15% by weight, or more, based upon the weight of the starting material. In either case, however, quantities substantially less than the maximum amounts stated will also produce excellent results. The cadmium or zinc can be readily recovered from the filter cakes and the waste solutions by methods known in industry.

In carrying out the transformation reaction in accordance with our invention, it is not necessary to use alkali metal salts of phthalic acid or isophthalic acid, as such. The starting material may also be composed of a reaction mixture which yields phthalic acid salts or isophthalic acid salts upon heating. Mixtures of phthalic acid anhydride or isophthalic acid anhydride and alkali metal carbonates, such as, for example, potassium carbonate, have been found to be particularly suitable for this purpose. The individual components of such reaction mixtures need not be present in stoichiometric ratios; one or the other component may, if desired, be present in excess of the stoichiometric amount.

In order to achieve a reaction which is sufficiently rapid for industrial purposes, it is necessary to heat the starting materials to temperatures above 340° C. The upper temperature limit for the transformation reaction in accordance with our invention is determined merely by the temperature at which the organic substances used as starting materials begin to decompose. In general, a temperature of 500° C. should not be exceeded because the compounds involved in the transformation reaction decompose above that temperature to an undesirably large extent.

In order to obtain good yields from the transformation reaction in accordance with our invention, it is advantageous to exclude oxygen from the reaction chamber in which the transformation reaction is to take place. For this purpose, it is advantageous to heat the starting materials in the presence of inert gases. The best yields are obtained when the transformation reaction is carried out in the presence of carbon dioxide. However, very good results can also be achieved when the transformation reaction takes place in the presence of other inert gases, such as nitrogen or methane.

In order to heat the reaction mixture uniformly, it is advantageous to agitate it, for example by stirring during heating. Thus, the reaction vessel may be provided with a stirring device. A particularly well-suited apparatus for carrying out the transformation reaction in accordance with our invention is a rotary furnace or kiln, in which the reaction mixture is continuously agitated by relatively large, loose bodies of inert materials, such as, for example, porcelain spheres or cubes, and in which carbon dioxide or other inert gas may be passed through the furnace or kiln. This method of agitation results in a particularly good heat exchange between the reaction mass and the heated wall of the reaction vessel, and simultaneously reduces the degree of charring of the reaction substance at the high temperatures which are required to bring about the transformation of the phthalates or isophthalates into the terephthalates. In addition, this method of agitation permits the reaction time to be reduced and also aids in the production of improved yields. Moreover, the removal of the reaction product from the reaction vessel and its further treatment to recover terephthalic acid are facilitated by this method, since the transformation reaction product takes the form of a powder. These advantages also make it possible to carry out the transformation reaction as a continuous process in which the reaction material may be introduced at one end of the kiln and the reaction products discharged at the other end.

Another suitable type of apparatus is a heatable kneader in which the reaction mass is thoroughly worked through. This is particularly true when the starting material is potassium phthalate, because this substance tends to take on a doughy consistency during a portion of the transformation reaction.

In order to achieve uniform heating of the reaction mass, the transformation reaction may also be carried out by heating thin layers of alkali metal phthalates or isophthalates, or mixtures of compounds which yield such alkali metal salts, without agitation and in an inert atmosphere, for example in an atmosphere of carbon dioxide. For this purpose, the available reaction chamber is subdivided into a plurality of narrow spaces with the aid of vertical and horizontal partitions. The partitions may be made of metal or any other suitable material and may be separated from each other by small distances of the order of a few centimeters.

A particularly advantageous embodiment of such an apparatus consists of a reaction vessel provided with a removable insert, which comprises a jacket provided with partitions of steel or sheet iron arranged at a distance from 1 to 3 centimeters from and at right angles to each other to form a lattice. The partitions, as well as the outer wall of this insert, may be provided with apertures through which the dry starting material can be easily introduced into the subdivided reaction chamber. The reaction product can also be easily removed from such a container.

It is not necessary that the starting material, whether it be an alkali metal salt of phthalic acid or isophthalic acid, or a mixture of compounds yielding such alkali metal salts, be present in its pure form. Thus, the starting material may also be admixed with inert materials, such as, for example, sand, carbon, metal powder, metal shavings or chunks of metal. Moreover, the starting material may also be admixed with inert salts, such as, for example, potassium carbonate, potassium sulfate or potassium chloride.

After the transformation reaction is completed, the resultant reaction mixture may be treated in a very simple fashion to recover terephthalic acid. Thus, the various carboxylic acids formed during the transformation reaction can be separated by methods which are based on the varying solubilities of benzene carboxylic acids, such as benzoic acid, phthalic acid and terephthalic acid, or their derivatives, in water and other solvents. In general, it is advantageous to separate the individual components by dissolving the reaction mixture in water, filtering off insoluble impurities from the solution and precipitating the corresponding organic acids by acidifying the aqueous filtrate with acids, such as hydrochloric acid or sulfuric acid. The precipitate, consisting of a mixture of benzene mono- and poly-carboxylic acids, but mainly of terephthalic acid, is then filtered off and the filter cake is extracted with water, whereby untransformed starting material and water-soluble benzene carboxylic acids are dissolved and terephthalic acid remains behind as an insoluble residue. The terephthalic acid thus obtained may thereafter be purified by redissolving it in alkalis and reprecipitating it from the alkaline solution with acids.

Other methods of separating the individual components of the reaction product are based upon the capability of the individual benzene carboxylic acids to sublime and upon the different volatilities of their esters, such as, for example, the methyl ester. The alkali metal salt mixture which forms the reaction product of the transformation reaction in accordance with our invention may, however, also be used directly for the production of derivatives of the various benzene carboxylic acids contained therein. The waste solutions of the process in accordance with our invention readily yield other benzene carboxylic acids as side reaction products, such as, for example, benzoic acid and trimesitinic acid.

The effect of the catalysts is shown by an acceleration of the transformation reaction, whereby the transformation of alkali metal phthalates or isophthalates into the alkali metal salts of terephthalic acid is favored over simultaneously occurring decomposition reactions. This effect consequently results in a substantial increase in the yield of terephthalic acid. A further consequence of the acceleration of the transformation reaction is the possibility of reducing the reaction time. The transformation reaction takes precedence over other side reactions at low pressures, particularly at atmospheric pressure and even in a vacuum. Remarkably high yields are therefore obtained within a surprisingly short period of time at low pressures and at atmospheric pressure.

The following examples will serve to illustrate our invention and enable other persons skilled in the art to understand our invention more completely. It is understood, however, that these examples are merely illustrative embodiments of our invention and that the invention is not limited thereto.

In these examples the starting materials were used in the form of anhydrous powders unless otherwise indicated, and wherever an autoclave was used such autoclave was provided with an agitating device made of refined steel and had a net volume of 500 to 1500 cc. unless otherwise indicated. The autoclave was, in addition, provided with a removable lining made of refined steel and was electrically heated.

*Example 1*

140 gm. anhydrous potassium carbonate and 150 gm. phthalic acid anhydride were heated in an autoclave for 6 hours at 400° C. in the presence of 10 gm. cadmium oxide. Before heating the reaction mixture, carbon dioxide was introduced into the reaction vessel until the pressure reached 50 atmospheres gauge. Upon heating, the maximum pressure in the autoclave reached 190 atmospheres gauge. At the end of 6 hours, the autoclave and its contents were allowed to cool. Upon opening the autoclave, 249 gm. of a gray reaction product were withdrawn therefrom. 100 gm. of this reaction product were dissolved in 600 cc. water, the solution was heated to boiling and then filtered. The filter cake was thoroughly washed with hot water. The filtrate was then acidified with dilute hydrochloric acid, whereupon a precipitate formed which was filtered off and repeatedly extracted with 500 cc. boiling water. A portion of the precipitate dissolved in the boiling water but 52.3 gm. of an insoluble residue remained behind. The residue was analyzed to be pure terephthalic acid. The yield was calculated to be 77.4% of the theoretical yield.

*Example 2*

200 gm. dipotassium phthalate and 10 gm. cadmium oxide were heated for 5 hours at 425° C. in a rotary autoclave, having a net volume of 1.4 liters, which contained loose porcelain spheres in its interior. Before heating the autoclave and its contents, carbon dioxide was introduced until the interior pressure reached 50 atmospheres gauge. The maximum pressure reached during the heating step was 120 atmospheres gauge. The reaction product, weighing 201 gm., was withdrawn from the cooled autoclave. 100 gm. of this reaction product were dissolved in water and further treated as described in Example 1. The yield of pure terephthalic acid was 52.0 gm., which is 76.1% of the theoretical yield.

*Example 3*

140 gm. anhydrous potassium carbonate, 150 gm. phthalic acid anhydride and 7.5 gm. of a cadmium kieselguhr catalyst were charged into a rotary autoclave, having a net volume of 1.4 liters, which contained loose porcelain spheres in its interior. The autoclave was then slowly heated over a period of 6 hours to a temperature of 430° C. and this temperature was maintained over a period of 3 hours. Before heating, carbon dioxide was introduced into the autoclave until the interior pressure reached 10 atmospheres gauge and the interior pressure was maintained at this value throughout the preheating and reaction period. A reaction product weighing 243 gm. was removed from the cooled autoclave and 100 gm. of this reaction product were treated as described in Example 1. The yield of pure terephthalic acid was 49.1 gm., which is 71% of the theoretical yield.

*Example 4*

200 gm. dipotassium phthalate and 10 gm. cadmium oxide were charged into a rotary autoclave, having a net volume of 1.4 liters, which contained loose porcelain spheres in its interior. The autoclave and its contents were then slowly heated over a period of 6 hours to a temperature of 430° C. and this temperature was maintained for 3 hours. The pressure in the autoclave was atmospheric pressure at all times. The reaction space within the autoclave was flushed with carbon dioxide every 60 minutes. A reaction product weighing 197 gm. was formed, of which 100 gm. were treated as described in Example 1. The yield of terephthalic acid was 44.8 gm., which is 64.2% of the theoretical yield.

*Example 5*

140 gm. anhydrous potassium carbonate, 150 gm. phthalic acid anhydride and 10 gm. cadmium sulfide were heated for 6 hours at 400° C. in an autoclave. Before heating the autoclave and its contents, carbon dioxide was introduced into the interior thereof until the internal pressure reached 50 atmospheres gauge. The maximum pressure during the heating step reached 120 atmospheres gauge. A reaction product weighing 251 gm. was withdrawn from the cooled autoclave. 100 gm. of this reaction product were treated as described in Example 1. The yield of terephthalic acid was 31.8 gm., which is 47.6% of the theoretical yield. The waste solutions were extracted with ether and yielded 17.4 gm. tricarboxylic acids and 8.5 gm. benzoic acid and phthalic acid. The yield of tricarboxylic acids was 20.6% of the theoretical yield and the yield of benzoic acid was 12.7% of the theoretical yield.

*Example 6*

140 gm. potassium carbonate, 150 gm. phthalic acid anhydride and 4 gm. powdered metallic cadmium were heated for 6 hours at 400° C. in an autoclave having a net volume of 1 liter. Before heating, carbon dioxide was introduced into the autoclave until the internal pressure reached 50 atmospheres gauge. After heating the autoclave and its contents for 6 hours, the pressure was 190 atmospheres gauge. A reaction product weighing 243 gm. was recovered. 100 gm. of this reaction product were treated as described in Example 1. The yield of terephthalic acid was 43.7 gm., which is 63.1% of the theoretical yield.

*Example 7*

200 gm. dipotassium phthalate and 10 gm. of a powdered cadmium-magnesium alloy, composed of 60 parts cadmium and 40 parts magnesium, were heated for 3 hours at 430° C. in a rotary autoclave having a net volume of 1.4 liters. Carbon dioxide was introduced into the autoclave before heating the same until the internal pressure reached 5 atmospheres gauge, and this pressure was maintained throughout the heating step. A reaction product weighing 198 gm. was formed. 100 gm. of this reaction product were treated as described in Example 1. The yield of terephthalic acid was 28.8 gm., which is 41.5% of the theoretical yield.

*Example 8*

4920 gm. phthalic acid anhydride and 4480 gm. caustic alkali were dissolved in 20 liters of water. 3 liters of this solution were mixed with a solution prepared by mixing a solution of 2.5 gm. cadmium sulfate in 20 cc. water with a solution of 15 gm. sodium hexametaphosphate (marketed under the trademark Calgon) in 75 cc. water. This solution was evaporated in a spray-drying apparatus by atomizing the solution in a stream of hot air. A fine powder was produced thereby which was kept for 20 hours in a drying chamber at 120° C. 300 gm. of the complex cadmium metaphosphate-containing dipotassium phthalate were heated for 6 hours at 400° C. in an autoclave. Before heating the autoclave and its contents, carbon dioxide was introduced until the internal pressure reached 50 atmospheres gauge. Upon heating, the maximum pressure reached 123 atmospheres gauge. A light gray reaction product was formed, which was treated in the manner described in Example 1. 117 gm. of pure terephthalic acid were obtained, which is 56.9% of the theoretical yield. The waste solutions contained 3 gm. water-soluble benzene carboxylic acids.

*Example 9*

300 gm. dipotassium phthalate were mixed with 1 gm. cadmium phthalate and the mixture was heated in an autoclave for 6 hours at 400° C. The initial pressure of carbon dioxide was 50 atmospheres gauge and the maximum pressure was 137 atmospheres gauge. A light-colored reaction product was formed which was treated as described in Example 1 and yielded 163 gm. of pure terephthalic acid, which is 78.9% of the theoretical yield. When the amount of cadmium phthalate in the starting mixture was increased to 5 gm., the yield of terephthalic acid increased to 172 gm., which is 82.1% of the theoretical yield.

*Example 10*

300 gm. dipotassium phthalate admixed with 2.5 gm. cadmium soap were heated for 6 hours at 400° C. in an autoclave in an atmosphere of carbon dioxide. The fatty acid content of the cadmium soap was that of a normal fatty acid soap. The starting pressure of carbon dioxide was 50 atmospheres gauge and the maximum pressure reached was 123 atmospheres gauge. A light gray reaction product was formed, which was treated as described in Example 1 and yielded 154 gm. pure terephthalic acid, which is 74.8% of the theoretical yield. When the amount of cadmium soap in the starting mixture was increased to 5 gm., 152 gm. terephthalic acid were recovered, which is 73.9% of the theoretical yield.

*Example 11*

A mixture of 150 gm. phthalic acid anhydride, 106 gm. anhydrous sodium carbonate and 15 gm. cadmium phthalate were heated for 6 hours at 400° C. in an autoclave in an atmosphere of carbon dioxide. The starting pressure of carbon dioxide was 50 atmospheres gauge and during the heating step the internal pressure reached a maximum of 180 atmospheres gauge. A dark gray substance weighing 202 gm. was formed which, upon treatment as described in Example 1, yielded 32 gm. terephthalic acid, which is 14.5% of the theoretical yield. The waste solutions yielded 14 gm. water-soluble benzene carboxylic acids.

*Example 12*

A mixture of 150 gm. phthalic acid anhydride, 140 gm. potassium carbonate and 4 gm. cadmium sulfate was heated for 8 hours at 400° C. in an atmosphere of carbon dioxide in an autoclave. The starting pressure of carbon dioxide was 50 atmospheres gauge and during the heating step the maximum pressure reached was 165 atmospheres gauge. A light gray reaction product, having the odor of benzene, was formed. This reaction product was treated as described in Example 1 and yielded 115 gm. pure terephthalic acid, which is 69.3% of the theoretical yield. 12 gm. of water-soluble benzene carboxylic acids crystallized from the waste solutions. When the same mixture was heated in thin layers on a lattice insert, without agitation, under otherwise similar conditions, the yield of terephthalic acid was 92 gm., which is 54.7% of the theoretical yield.

*Example 13*

150 gm. dipotassium phthalate and 10 gm. cadmium iodide were placed into an open vessel made of V4A steel provided with a mechanical stirrer, and the vessel and its contents were heated within 30 minutes from 330 to 400° C. with the aid of a preheated salt bath. Subsequently, the temperature was maintained at 400° C. for 1 hour, then increased to 430° C. and maintained at that level for 3 additional hours. During the entire heating period, a vigorous stream of carbon dioxide was continuously fed into the reaction vessel. A reaction product weighing 150 gm. was formed, of which 100 gm. were treated as described in Example 1. The yield of terephthalic acid was 40.5 gm., which is 58.9% of the theoretical yield.

*Example 14*

1500 gm. dipotassium phthalate were admixed with 75 gm. cadmium oxide and the mixture was charged into a rotary furnace provided with a copper lining electrolytically coated with cadmium. The furnace was slowly heated to 425° C. over a period of 5 hours and this temperature was maintained for an additional hour. Carbon dioxide was passed through the furnace at atmospheric pressure during the entire heating period. The reaction product formed thereby was treated as described in Example 1. The yield of terephthalic acid was 870 gm., which is 84.5% of the theoretical yield. The waste solutions yielded 25 gm. trimesitinic acid and 85 gm. benzoic acid.

*Example 15*

200 gm. dipotassium phthalate and 20 gm. cadmium chloride were heated in a rotary furnace in an atmosphere of carbon dioxide at normal pressure for 3 hours at a temperature of 430° C. A reaction production weighing 203 gm. was formed, of which 100 gm. were treated as described in Example 1. The yield of terephthalic acid was 38.3 gm., which is 56.5% of the theoretical yield.

*Example 16*

200 gm. dipotassium phthalate and 13.5 gm. cadmium carbonate were heated in a rotary furnace at normal pressure in an atmosphere of carbon dioxide for 3 hours and at a temperature of 430° C. A reaction product weighing 207 gm. was formed, of which 100 gm. were treated as described in Example 1. The yield of terephthalic acid was 38.2 gm., which is 57.5% of the theoretical yield.

*Example 17*

A round iron vessel 22 cm. long and having a diameter of 9 cm. was provided with a kneading device powered by a powerful motor. The kneading device consisted of a planetary stirring system, to which two stirring blades were fastened, and a scraper contacting the walls of the vessel. The iron container was heated from the outside by a lead bath. A mixture of 200 gm. dipotassium phthalate and 6 gm. cadmium oxide was heated in this vessel at a temperature of approximately 400° C. for an extended period of time. The temperature was measured in the lead bath. The preliminary heating period was 25 minutes and thereafter the reaction mass was agitated for 10 minutes at a lead bath temperature of 410° C. The reaction mass temporarily took on a doughy consistency, but upon continued stirring was transformed into a fine powder. During the entire heating period a gentle stream of carbon dioxide was blown into the upper portion of the reaction vessel. A light gray reaction product, weighing 191 grams, was formed; a certain amount of loss was caused by dust formation. The reaction product was treated as described in Example 1 and yielded 115 gm. pure terephthalic acid. This yield is 90.5% based upon the weight of the reaction product formed in the reaction vessel, and 83.9% of the theoretical yield based upon the amount of starting material used.

*Example 18*

200 gm. dipotassium phthalate admixed with 10 gm. cadmium oxide and 10 gm. copper powder were heated in a stream of carbon dioxide for 3 hours at 425° C. in a rotary furnace having a net volume of 1.4 liters. A reaction product weighing 213 gm. was formed, of which 100 gm. were treated in the manner described in Example 1. The yield of terephthalic acid was 39.5 gm., which is 61.1% of the theoretrical yield.

*Example 19*

150 gm. dipotassium phthalate were admixed with 8 gm. powdered cadmium carbonate and the mixture was charged into a glass flask, which was provided with a feed line for introducing carbon dioxide into the flask. The mixture was then heated for 2 hours at temperatures ranging from 360 to 370° C. in a salt bath and in an atmosphere of carbon dioxide. The reaction product formed thereby was treated in the manner described in Example 1 and yielded 43.3 gm. of pure terephthalic acid, which is 42.1% of the theoretical yield.

*Example 20*

A solution of 200 gm. dipotassium phthalate in 125 cc. water, having 10 gm. cadmium oxide suspended therein, was charged into a rotary furnace having a net volume of 1.4 liters. The furnace and its contents were then slowly heated over a period of 6 hours to 430° C., and this temperature was subsequently maintained for an additional hour. During the preheating step, the water evaporated and after all the water was evaporated the furnace was periodically flushed with carbon dioxide. A reaction product weighing 205 gm. was formed, 100 gm. of which were treated as described in Example 1. The yield of terephthalic acid was 42.8 gm., which is 63.8% of the theoretical yield.

*Example 21*

300 gm. dipotassium phthalate and 10 gm. cadmium phthalate were charged into a rotary reaction vessel and heated for 3 hours at a temperature of 400° C. at atmospheric pressure, while occasionally passing carbon dioxide through the vessel. The reaction product thus formed was treated as described in Example 1 and yielded 123 gm. terephthalic acid, which is 56.8% of the theoretical yield.

*Example 22*

200 gm. dipotassium phthalate and 10 gm. cadmium oxide were placed into a reaction vessel made of SM steel, which was electrically heated. The vessel was evacuated and then preheated over a period of 6 hours to a temperature of 380° C., which temperature was then maintained over a period of 3 hours (the temperature was measured in the interior of the vessel). During the entire heating step, a vacuum of 11 mm. was maintained with the aid of a water aspirator pump. A reaction product weighing 205 gm. was formed, 100 gm. of which were treated as described in Example 1. The yield of terephthalic acid was 39.0 gm., which is 58.1% of the theoretical yield.

*Example 23*

110 gm. anhydrous sodium carbonate, 150 gm. phthalic acid anhydride and 10 gm. of a cadmium-kieselguhr catalyst were heated in a rotary autoclave in an atmosphere of carbon dioxide for 4 hours at a temperature of 440° C. Before heating, the pressure of carbon dioxide was 50 atmospheres gauge and, during heating, this pressure rose to a maximum of 180 atmospheres gauge. A reaction product weighing 212 gm. was formed, 100 gm. of which were treated in the manner described in Example 1. The yield of terephthalic acid was 19.2 gm., which is 24.2% of the theoretical yield.

*Example 24*

110 gm. sodium carbonate, 150 gm. phthalic acid anhydride and 10 gm. cadmium oxide were heated in an autoclave in an atmosphere of carbon dioxide for 6 hours and at 400° C. Before heating, the pressure of carbon dioxide was 50 atmospheres gauge, and this pressure increased to a maximum of 185 atmospheres gauge during the heating step. A reaction product weighing 199 gm. was formed, 100 gm. of which, upon being treated as described in Example 1—that is, by dissolving it in water, precipitating the organic acids by acidification of the aqueous solution with hydrochloric acid, filtering off the precipitated acids and extracting the filter cake with boiling water—yielded 19.9 gm. of pure terephthalic acid, which is 20.1% of the theoretical yield.

*Example 25*

210 gm. disodium phthalate were heated in a rotary furnace for 3 hours at a temperature of 430° C. in an atmosphere of carbon dioxide and in the presence of 40 gm. of cadmium oxide. The pressure of carbon dioxide in the furnace was atmospheric pressure throughout the heating step. The reaction mixture was heavily charred, but a reaction product weighing 194 gm. was formed, which was then treated as described in Example 1. The yield of terephthalic acid was 10.8 gm., which is 6.5% of the theoretical yield.

*Example 26*

150 gm. phthalic acid anhydride, 75 gm. lithium carbonate and 10 gm. cadmium oxide were heated in an atmosphere of carbon dioxide for 5 hours at a temperature of 400° C. in an autoclave. Before heating, the pressure of carbon dioxide was 47 atmospheres gauge and this pressure reached a maximum of 72 atmospheres gauge during the heating step. A black, solid reaction product weighing 155 gm. was formed, which was subsequently treated as described in Example 1. The yield of pure terephthalic acid was 28 gm., which is 17.2% of the theoretical yield.

*Example 27*

150 gm. dipotassium isophthalate and 7.5 gm. of cadmium oxide-kieselguhr catalyst were heated in a rotary autoclave having a net volume of 1.4 liters for 5 hours at a temperature of 430° C. Carbon dioxide was introduced into the autoclave before it was heated and the pressure of carbon dioxide in the cold was adjusted to 50 atmospheres gauge. Upon heating, the internal pressure reached a maximum of 150 atmospheres gauge. A reaction product weighing 146 gm. was formed, 100 gm. of which were then boiled in water. The resulting solution was separated from the catalyst and the carbon formed during the transformation reaction by filtering the solution, and the filtrate was then heated and acidified with hydrochloric acid. The precipitated terephthalic acid was twice extracted with boiling water and finally dried at 120° C. The yield of pure terephthalic acid was 46.9 gm., which is 66.4% of the theoretical yield. In order to show the purity of the terephthalic acid thus obtained, it was converted into the dimethyl ester, which was obtained with a yield of 97%.

*Example 28*

200 gm. dipotassium isophthalate and 10 gm. cadmium oxide were heated for 4 hours at 430° C. in a rotary autoclave having a net volume of 1.4 liters. During this time, the interior of the autoclave was occasionally flushed with carbon dioxide at atmospheric pressure. A reaction product weighing 193 gm. was formed, of which 100 gm. were treated as described in Example 1. The yield of terephthalic acid was 32.4 gm., which is 45.5% of the theoretical yield.

*Example 29*

150 gm. of a mixture composed of equal parts of dipotassium phthalate and dipotassium isophthalate were heated in a rotary autoclave having a net volume of 1.4 liters, in an atmosphere of carbon dioxide and in the presence of 5 gm. of cadmium oxide and 2.5 gm. of a cadmium oxide-kieselguhr catalyst, for 3 hours at a temperature of 430° C. The pressure of carbon dioxide was maintained at atmospheric pressure throughout the heating period. A reaction product weighing 148 gm. was formed, 100 gm. of which were treated as in Example 1. The yield of terephthalic acid was 34.7 gm., which is 49.8% of the theoretical yield.

*Example 30*

A mixture of 100 gm. dipotassium isophthalate, 60 gm. dipotassium ortho-phthalate, 40 gm. dipotassium terephthalate and 10 gm. cadmium oxide were heated in a rotary furnace for 3 hours at a temperature of 430° C., in an atmosphere of carbon dioxide at atmospheric pressure. A reaction product weighing 195 gm. was formed, 100 gm. of which were treated in the manner described in Example 1. The yield of pure terephthalic acid was 41.6 gm., which is 59% of the theoretical yield.

*Example 31*

A mixture of 100 gm. dipotassium isophthalate, 25 gm. dipotassium terephthalate and 100 gm. cadmium oxide was heated in a rotary furnace for 3 hours at a temperature of 430° C., in an atmosphere of carbon dioxide at atmospheric pressure. The reaction product weighed 125 gm. All of this product was treated in the manner described in Example 1 and thereby yielded terephthalic acid in a quantity amounting to 63% of the theoretical yield.

*Example 32*

30 kg. dipotassium phthalate admixed with 1.5 kg. of cadmium oxide were charged into a gas-heated rotary furnace having a net volume of 130 liters. The rotary furnace also contained loose porcelain spheres having a diameter of about 5 cm. The rotary furnace and its contents were slowly heated over a period of 3 hours to a temperature of 400° C., which was then maintained for 4 additional hours. The temperature was measured in the interior of the rotary furnace. Carbon dioxide was passed through the rotary furnace at atmospheric pressure throughout the heating step. A reaction product weighing 30.97 kg. was formed, all of which was treated in the manner described in Example 1. The yield of terephthalic acid was 16.40 kg., which is 80.0% of the theoretical yield. In addition, the waste solutions yielded 0.82 kg. of a mixture of benzoic acid and trimesitinic acid, which is approximately 4% of the theoretical yield.

*Example 33*

150 gm. of a mixture containing about 90% phthalic acid anhydride and 7% benzoic acid were admixed with 140 gm. potassium carbonate and dissolved in a small quantity of water, then filtered and evaporated to dryness. The resulting salt was admixed with 9 gm. cadmium oxide and placed in a vessel as described in Example 17. Thereafter the vessel and its contents were heated for 20 minutes at a temperature of 420° C., while passing carbon dioxide into the vessel and over the reaction mass. A dark gray powder weighing 216 gm. was formed, which was dissolved in 1000 cc. water by heating the water to the boiling point. The resulting hot solution was then filtered. The filtrate was acidified with hydrochloric acid, whereby a mixture of organic acids was precipitated. The precipitate was filtered off and repeatedly extracted with 500 cc. hot water. The yield of pure terephthalic acid was 84 gm., which is 55.47% of the theoretical yield.

*Example 34*

In the production of phthalic acid anhydride, the raw product is subjected to a distillation. The residue remaining in the distillation flask is a black substance of a tar-like consistency. This residue contains comparatively large amounts (50 to 60%) of phthalic acid anhydride. The saponification number of this residue is 710. 148 gm. of this residue were admixed with 138 gm. potassium carbonate and 10 gm. cadmium oxide and the mixture was heated for 1 hour at a temperature of 430° C., in an atmosphere of carbon dioxide, in a rotary autoclave having a net volume of 1.4 liters. Before heating, the pressure of carbon dioxide in the autoclave was adjusted to 50 atmospheres gauge. During the heating step, this pressure reached a maximum of 156 atmospheres gauge. A reaction product weighing 238 gm. was formed, 100 gm. of which were treated as described in Example 1. The yield of terephthalic acid was 45.2 gm., which is 64.9% of the theoretical yield.

*Example 35*

152 gm. of the distillation residue mentioned in the preceding example were neutralized with the theoretical amount of potassium hydroxide. The resulting solution was then evaporated to dryness and the solid substance resulting therefrom was admixed with 15 gm. cadmium oxide. This mixture was subsequently heated in a rotary furnace in an atmosphere of carbon dioxide, at atmospheric pressure, for 1 hour at a temperature of 430° C. A reaction product weighing 260 gm. was obtained, 100 gm. of which were treated in the manner described in Example 1. The terephthalic acid yield was 32.5 gm., which is 50.2% of the theoretical yield.

*Example 36*

150 gm. dipotassium phthalate and 3 gm. cadmium fluoride (2% by weight based on the amount of dipotassium phthalate) were heated in a rotary autoclave for 1 hour at a temperature of 430° C. Before heating, carbon dioxide was introduced and the internal pressure was adjusted to 50 atmospheres gauge. During the heating, the internal pressure reached a maximum of 140 atmospheres gauge. A reaction product weighing 153 gm. was formed, 100 gm. of which were treated in the manner described in Example 1. The yield of terephthalic acid was 62.9 gm., which is 93.4% of the theoretical yield. A purity test of the terephthalic acid thus obtained, by means of the thallium acetate method, showed that the acid is practically chemically pure.

The use of 3% cadmium fluoride and heating the reaction mass in an atmosphere of carbon dioxide at atmospheric pressure results in terephthalic acid yields of about 75% of the theoretical yield.

*Example 37*

20 gm. of a mixture made from 30 gm. anhydrous potassium carbonate and 2.7 gm. cadmium fluoride were placed in a glass tube, which was heated by an aluminum block. The glass tube and its contents were heated to 420° C. and phthalic acid anhydride vapor preheated to 420° C. was passed through the glass tube. From the difference between the evaporated and recondensed anhydride, it was calculated that 9.6 gm. of the starting material were transformed. A reaction product weighing 25.5 gm. was formed in the glass tube, which was subsequently treated as described in Example 1. The yield of terephthalic acid was 3.9 gm., which is 36.6% of the theoretical yield based upon the transformed phthalic acid anhydride.

*Example 38*

17.95 kg. dipotassium phthalate were admixed with 3% by weight of cadmium fluoride. The mixture was charged into a round iron vessel having a diameter of about 30 cm. and compacted therein. The vessel and its contents were then heated at 450° C. in a hot salt bath until a thermometer placed into the center of the reaction mass registered a temperature of 420° C. A reaction product weighing 17.20 kg. was formed. Samples weighing 20 gm. were taken from this mass and treated as described in Example 1. Each sample yielded from 10.55 to 10.57 gm. of terephthalic acid, which is a yield of 76.4 to 76.5% of the theoretical yield.

*Example 39*

15 gm. of dipotassium phthalate in admixture with 0.75 to 0.8 gm. of one of the zinc compounds shown in the table below were placed into a glass vessel embedded in a gas-heated aluminum block, and the vessel and its contents were thus heated for 1 hour at a temperature of 450° C. During the heating step, dry carbon dioxide at atmospheric pressure was passed over the reaction mixture. After cooling, the reaction product was treated as described in Example 1. The table below shows the yield of terephthalic acid for each zinc compound used as a catalyst.

| Zinc compound: | Yield in percent of theory |
| --- | --- |
| Zinc fluoride | 55 |
| Zinc sulfate | 37 |
| Zinc iodide | 31 |
| Zinc cyanide | 49 |
| Zinc silicon fluoride | 48 |
| Zinc chloride | 54 |
| Zinc phosphate | 53 |
| Zinc phthalate | 51 |
| Zinc terephthalate | 45 |

*Example 40*

200 gm. dipotassium phthalate in admixture with 7.5 gm. zinc chloride were placed into a rotary furnace having a net volume of 1.4 liters. The rotary furnace and its contents were then slowly heated to 430° C. and this temperature was maintained for an additional hour. During the entire heating period a stream of carbon dioxide at atmospheric pressure was passed through the furnace. A reaction product weighing 183 gm. was formed. The reaction product was treated as described in Example 1 and the yield of terephthalic acid was found to be 39% of the theoretical yield. When a mixture of 6 gm. zinc chloride and 4 gm. $CdCl_2.2.5\ H_2O$ was used as the catalyst instead of the zinc chloride alone, the yield of terephthalic acid, at otherwise identical conditions, was 59% of the theoretical yield.

*Example 41*

200 gm. dipotassium phthalate and 15 gm. zinc chloride were charged into a rotary autoclave having a net volume of 1.4 liters. The autoclave and its contents were then heated for 1 hour at 430° C. Before heating, however, carbon dioxide was introduced into the autoclave until the internal pressure reached 50 atmospheres gauge. During heating, this pressure reached a maximum of 164 atmospheres gauge. A reaction product was obtained which weighed 212 gm. and this reaction product was treated as described in Example 1. The yield of terephthalic acid was 82% of the theoretical yield.

*Example 42*

150 gm. dipotassium phthalate were admixed with each one of the catalysts of the table below and this mixture was heated for 5 hours at 400° C. while passing carbon dioxide at atmospheric pressure over the reaction mass. The reaction product was treated as described in Example 1 and the following yields of terephthalic acid were obtained:

| Zinc Compound | Yield of Terephthalic Acid in Percent of Theory |
|---|---|
| 5 gm. zinc chloride | 38 |
| 10 gm. zinc chloride | 41 |
| 15 gm. zinc chloride | 59 |
| 20 gm. zinc chloride | 49 |
| 5 gm. zinc chloride+10 gm. lead chloride | 50 |
| 5 gm. zinc nitrate | 24 |
| 5 gm. zinc sulfate | 17 |
| 25 gm. zinc granules | 31 |

*Example 43*

100 gm. of disodium phthalate were admixed with 4 gm. zinc oxide and the mixture was heated in an autoclave for 6 hours at a temperature of 400° C. Before heating, the pressure of carbon dioxide in the autoclave was adjusted to 50 atmospheres gauge and, during heating, the pressure rose to a maximum of 121 atmospheres gauge. The reaction product was treated in the manner described in Example 1 and yielded 14% of the theoretical yield of terephthalic acid.

*Example 44*

150 gm. phthalic acid anhydride were admixed with 140 gm. potassium carbonate and one of the catalysts shown in the table below. The mixture was then heated in an autoclave for 6 hours at a temperature of 400° C. accompanied by thorough agitation. Before heating, however, carbon dioxide was introduced into the autoclave until the internal pressure reached 50 atmospheres gauge. The maximum internal pressure for each catalyst used, which was reached during the heating step, is also shown in the table below. The reaction product was treated as described in Example 1 and the percent yield of the theoretical yield of terephthalic acid is tabulated below:

| Catalyst | Maximum Pressure in Atmospheres Gauge | Terephthalic Acid Yield in Percent of Theory |
|---|---|---|
| 10 gm. zinc dust | 150 | 60 |
| 15 gm. zinc dust | 183 | 62 |
| 20 gm. zinc granules | 192 | 70 |

*Example 45*

300 gm. dipotassium phthalate were admixed with 50 gm. zinc granules and the mixture was heated in a rotary autoclave for 3 hours at 400° C. Prior to heating, however, carbon dioxide was introduced into the autoclave until the internal pressure reached 50 atmospheres gauge. The reaction product was treated as described in Example 1 and the terephthalic acid thus obtained represented a yield of 33% of the theoretical yield.

*Example 46*

100 gm. dipotassium isophthalate were admixed with one of the catalysts shown in the table below and the mixture was placed into an iron reaction vessel provided with a planetary agitating device. Carbon dioxide was introduced into the vessel at atmospheric pressure and the vessel and its contents were heated for 20 minutes at a temperature of 420° C. The carbon dioxide continued to be introduced during the entire heating period. The reaction product was dissolved in hot water which was made slightly alkaline with sodium hydroxide. The resulting solution was filtered, the filter cake was washed with hot, slightly alkaline water, and the filtrate was acidified with hydrochloric acid. The precipitated free acids were filtered off and the filter cake was washed with hot water until the filtrate came through entirely clear. The filter residue consisting of terephthalic acid was dried. The catalysts used and the corresponding yields of terephthalic acid are tabulated below:

| Zinc Compound | Yield of Terephthalic Acid in Percent of Theory |
|---|---|
| 5 gm. zinc chloride | 31 |
| 5 gm. zinc oxide | 17 |
| 5 gm. zinc nitrate | 10 |
| 5 gm. zinc dust | 20 |
| 5 gm. zinc phosphate | 28 |
| 5 gm. zinc silicon fluoride | 27 |

*Example 47*

150 gm. dipotassium isophthalate were heated for 8 hours in an autoclave at a temperature of 400° C. in the presence of 7.5 gm. zinc chloride, accompanied by vigorous stirring. Prior to heating, however, carbon dioxide was introduced into the autoclave until the internal pressure reached 50 atmospheres gauge, and this pressure reached a maximum of 158 atmospheres gauge during the heating step. The reaction product produced thereby was treated as described in the preceding example. The yield of terephthalic acid was 39% of the theoretical yield.

*Example 48*

150 gm. dipotassium phthalate in admixture with 2.5 gm. cadmium chloride and 2.5 gm. zinc chloride were heated for 20 minutes at 420° C. in the apparatus and under the conditions described in Example 46. The reaction product formed thereby was then treated in the same manner as described in Example 46. The yield of pure terephthalic acid was 66 gm., which is 64.1% of the theoretical yield.

The potassium necessary for the transformation reaction in accordance with our invention may be partially recovered from the transformation reaction product, which consists essentially of dipotassium terephthalate, by reacting the same with phthalic acid anhydride in the presence of water. This reaction yields terephthalic acid and monopotassium phthalate, as illustrated by the following equation:

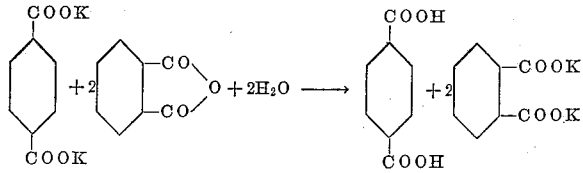

As much as 50% of the potassium can be recovered in this manner. The following example will serve as an illustration of this procedure:

*Example 49*

The product of the transformation reaction—that is, the mixture of the alkali metal salts of benzene dicarboxylic acids, including dipotassium terephthalate—was boiled in the usual manner in water. A carbonaceous residue remained behind which was filtered off, and the aqueous solution, which contained potassium carbonate in addition to dipotassium terephthalate, was evaporated to dryness. 60 gm. of the dry salt, which contained 30.2 gm. terephthalic acid in the form of its dipotassium salt, were heated with 70 gm. phthalic acid anhydride and 70 cc. of water for 1 hour at 190° C. The reaction product produced thereby was boiled in 300 cc. water. The terephthalic acid remaining behind, which weighed 29.2 gm., was filtered off from the solution. The filtrate, consisting largely of an aqueous solution of the mono-potassium salt of phthalic acid, was neutralized with a stoichiometric amount of potassium hydroxide and evaporated to dryness. 15 gm. of the dipotassium phthalate thus produced were mixed with 0.8 gm. cadmium oxide and heated at 450° C. in a suitable reaction vessel in an atmosphere of carbon dioxide. The terephthalic acid yield was from 7.2 to 7.4 gm., which is 70 to 72% of the theoretical yield.

In the above examples it is generally stated that, whenever it is desired to carry out the transformation reaction at elevated pressures, carbon dioxide is first introduced into the cold reaction vessel until the internal pressure reaches the desired value, and subsequently the vessel is heated, whereby the internal pressure reaches a certain maximum value. It is of course understood that, instead of filling the cold reaction vessel with the inert gas up to a certain pressure, one may also first fill the space within the reaction vessel with the inert gas at atmospheric pressure, and then compress the gas with a suitable mechanical device, such as a piston, for example, to any desired pressure. Yields as high as 85% of the theoretical yield of terephthalic acid have been achieved by this method.

While we have disclosed certain specific embodiments of our invention, we wish it to be understood that the invention is not limited to these specific embodiments, and that changes and modifications can be made therein without departing from the spirit of our invention or the scope of the following claims.

We claim:

1. A process for the production of terephthalic acid which comprises heating at least one material selected from the group consisting of alkali metal salts of benzene dicarboxylic acids wherein the carboxyl groups stand in other than para-position relative to each other and mixtures of compounds yielding such alkali metal salts when heated under the reaction conditions, to a temperature between 340° and 550° C. in an atmosphere substantially free from oxygen, and in the presence of a substance selected from the group consisting of cadmium, zinc, cadmium compounds and zinc compounds, transforming the alkali metal salt of terephthalic acid formed thereby into terephthalic acid, and separating the terephthalic acid from the reaction mass.

2. A process for the production of terephthalic acid which comprises heating at least one alkali metal salt of a benzene dicarboxylic acid, wherein the carboxyl groups stand in other than para-position relative to each other, to a temperature between 340° and 550° C. in an atmosphere substantially free from oxygen and in the presence of a substance selected from the group consisting of cadmium, zinc, cadmium compounds and zinc compounds, transforming the alkali metal salt of terephthalic acid formed thereby into terephthalic acid, and separating the terephthalic acid from the reaction mass.

3. A process for the production of terephthalic acid which comprises heating at least one alkali metal salt of a benzene dicarboxylic acid, wherein the carboxyl groups stand in other than para-position relative to each other, selected from the group consisting of potassium salts, sodium and lithium salts of isophthalic acid and phthalic acid, to a temperature between 340° and 550° C. in an atmosphere of an inert gas selected from the group consisting of carbon dioxide, nitrogen and methane, and in the presence of at least one substance selected from the group consisting of cadmium, zinc, cadmium compounds and zinc compounds, transforming the alkali metal salts of terephthalic acid formed thereby into terephthalic acid, and separating the terephthalic acid from the reaction mass.

4. A process for the production of terephthalic acid which comprises heating an alkali metal phthalate to a temperature between 340° and 550° C. in an atmosphere of carbon dioxide and in the presence of at least one substance selected from the group consisting of cadmium, zinc, cadmium compounds and zinc compounds, transforming the alkali metal terephthalate formed thereby into terephthalic acid, and separating the terephthalic acid from the reaction mass.

5. A process for the production of terephthalic acid which comprises heating dipotassium phthalate to a temperature between 340° and 550° C. in an atmosphere of carbon dioxide and in the presence of at least one substance selected from the group consisting of cadmium, zinc, cadmium compounds and zinc compounds, transforming the dipotassium terephthalate formed thereby into terephthalic acid, and separating the terephthalic acid from the reaction mass.

6. A process for the production of terephthalic acid which comprises heating disodium phthalate to a temperature between 340° and 550° C. in an atmosphere of carbon dioxide and in the presence of at least one substance selected from the group consisting of cadmium, zinc, cadmium compounds and zinc compounds, transforming the disodium terephthalate formed thereby into terephthalic acid, and separating the terephthalic acid from the reaction mass.

7. A process for the production of terephthalic acid which comprises heating dipotassium isophthalate to a temperature between 340° and 550° C. in an atmosphere of carbon dioxide and in the presence of at least one substance selected from the group consisting of cadmium, zinc, cadmium compounds and zinc compounds, transforming the dipotassium terephthalate formed thereby into terephthalic acid, and separating the terephthalic acid from the reaction mass.

8. A process for the production of terephthalic acid as in claim 1, which comprises heating said material at elevated pressures.

9. A process for the production of terephthalic acid as in claim 1, which comprises heating said material at atmospheric pressure.

10. A process for the production of terephthalic acid as in claim 1, which comprises heating said material at reduced pressures.

11. A process for the production of alkali metal terephthalates which comprises heating a material selected from the group consisting of alkali metal salts of benzene dicarboxylic acids wherein the carboxyl groups stand in other than para-position relative to each other, and mixtures of compounds yielding such alkali metal salts when heated under the reaction conditions, to a temperature between 340° and 550° C. in an atmosphere substantially free from oxygen and in the presence of a substance selected from the group consisting of cadmium, zinc, cadmium compounds and zinc compounds.

12. A process for the production of alkali metal terephthalates which comprises heating at least one alkali metal salt of a benzene dicarboxylic acid wherein the carboxyl groups stand in other than para-position relative to each other, to a temperature between 340° and 550° C. in an atmosphere substantially free from oxygen and in the presence of a substance selected from the group consisting of cadmium, zinc, cadmium compounds and zinc compounds.

13. A process for the production of alkali metal terephthalates which comprises heating at least one alkali metal salt of a benzene dicarboxylic acid, wherein the carboxyl groups stand in other than para-position relative to each other, selected from the group consisting of potassium salts and sodium salts of isophthalic and phthalic acid, to a temperature between 340° and 550°

C. in an atmosphere of an inert gas selected from the group consisting of carbon dioxide, nitrogen and methane, and in the presence of at least one substance selected from the group consisting of cadmium, zinc, cadmium compounds and zinc compounds.

14. A process for the production of alkali metal terephthalates which comprises heating an alkali metal phthalate to a temperature between 340° and 550° C. in an atmosphere of carbon dioxide and in the presence of at least one substance selected from the group consisting of cadimum, zinc, cadmium compounds and zinc compounds.

15. A process for the production of dipotassium terephthalate which comprises heating dipotassium phthalate to a temperature between 340° and 550° C. in an atmosphere of carbon dioxide and in the presence of at least one substance selected from the group consisting of cadmium, zinc, cadmium compounds and zinc compounds.

16. A process for the production of disodium terephthalate which comprises heating disodium phthalate to a temperature between 340° and 550° C. in an atmosphere of carbon dioxide and in the presence of at least one substance selected from the group consisting of cadmium, zinc, cadmium compounds and zinc compounds.

17. A process for the production of dipotassium terephthalate which comprises heating dipotassium isophthalate to a temperature between 340° and 550° C. in an atmosphere of carbon dioxide and in the presence of at least one substance selected from the group consisting of cadmium, zinc, cadmium compounds and zinc compounds.

18. A process for the production of alkali metal terephthalates as in claim 11 which comprises heating said material at elevated pressures.

19. A process for the production of alkali metal terephthalates as in claim 11 which comprises heating said material at atmospheric pressure.

20. A process for the production of alkali metal terephthalates as in claim 11 which comprises heating said material at reduced pressures.

21. A method of recovering the potassium phthalate and terephthalic acid from the reaction product of a transformation reaction of dipotassium phthalate into dipotassium terephthalate, which comprises heating said reaction product with phthalic acid anhydride in the presence of water to form terephthalic acid and monopotassium phthalate, and separating the monopotassium phthalate from the terephthalic acid.

22. A process for the production of alkali metal terephthalates which comprises heating a mixture containing at least two alkali metal benzene carboxylic acids wherein carboxyl groups stand in other than para-position relative to each other to a temperature between 340° and 550° C. in an atmosphere substantially free from oxygen and in the presence of a substance selected from the group consisting of cadmium, zinc, cadmium compounds and zinc compounds until a substantial amount of said carboxyl groups have been rearranged to alkali metal terephthalates.

No references cited.